United States Patent
Srinivasan

(10) Patent No.: US 8,677,030 B2
(45) Date of Patent: Mar. 18, 2014

(54) APPARATUS AND METHOD FOR MANAGING PACKET CLASSIFICATION TABLES

(75) Inventor: Arvind Srinivasan, San Jose, CA (US)

(73) Assignee: Oracle America, Inc., Redwood Shores, CA (US)

( * ) Notice: Subject to any disclaimer, the term of this patent is extended or adjusted under 35 U.S.C. 154(b) by 845 days.

(21) Appl. No.: 12/633,926

(22) Filed: Dec. 9, 2009

(65) Prior Publication Data

US 2011/0134915 A1   Jun. 9, 2011

(51) Int. Cl.
*G06F 13/28* (2006.01)

(52) U.S. Cl.
USPC ............................................. 710/22; 370/389

(58) Field of Classification Search
CPC ................................ G06F 13/28; H04L 12/56
See application file for complete search history.

(56) References Cited

U.S. PATENT DOCUMENTS

| | | | | |
|---|---|---|---|---|
| 7,567,567 B2 * | 7/2009 | Muller et al. | | 370/392 |
| 7,707,346 B2 * | 4/2010 | Deshpande et al. | | 710/310 |
| 8,165,125 B2 * | 4/2012 | Kim et al. | | 370/392 |
| 2003/0202470 A1 * | 10/2003 | Szumilas | | 370/230.1 |
| 2005/0083935 A1 * | 4/2005 | Kounavis et al. | | 370/392 |
| 2005/0152369 A1 * | 7/2005 | Ambe et al. | | 370/392 |
| 2005/0226235 A1 * | 10/2005 | Kumar et al. | | 370/386 |

* cited by examiner

*Primary Examiner* — Idriss N Alrobaye
*Assistant Examiner* — Dayton Lewis-Taylor
(74) *Attorney, Agent, or Firm* — Park, Vaughan, Fleming & Dowler LLP

(57) ABSTRACT

Methods and apparatus are provided for managing classification of packets within a multi-function input/output device, and for allowing the device's classification tables to be cleared in a non-blocking manner. The input/output device conveys multiple communication connections corresponding to multiple physical and/or virtual PCIe (Peripheral Component Interconnect Express) functions bound to software images executing on hosts. The device comprises gate logic configured to indicate statuses of the functions or the DMA engines bound to the functions. When the gate logic indicates a particular destination function is valid, the packet is transferred normally after being classified. A portion of the logic corresponding to a given function is reprogrammed to indicate the function is invalid when that function is reinitialized (e.g., FLR or Function Level Reset). The function's entries in packet classification tables are cleared afterward. When the logic indicates a function is invalid, packets destined for that function are dropped.

18 Claims, 6 Drawing Sheets

| Destination MAC Address | Function | DMA |
|---|---|---|
| DA1 | F0/VF2 | |
| DA2 | F1/VF0 | |
| . . . | . . . | . . . |

L2 Unicast Table 202

| Key | Function | DMA |
|---|---|---|
| Key1 | F1/VF1 | |
| Key2 | F0/VF1 | |
| . . . | . . . | . . . |

L3/L4 Classification Table 212

| Entry 224a | Entry 224b | Entry 224c | | Entry 224d |
|---|---|---|---|---|
| 1 | 1 | 0 | . . . | 1 |

Gate Logic 222

FIG. 2

APPARATUS AND METHOD FOR MANAGING PACKET CLASSIFICATION TABLES

BACKGROUND

This invention relates to the field of computers. More particularly, apparatus and methods are provided for managing packet classification tables used to classify traffic traversing a multi-function network interface device.

Virtualized I/O devices provide considerable value because they allow a high-performance peripheral component to be shared among multiple applications, making it seem as if each application is receiving a separate, dedicated I/O device. From an application's perspective, each virtual device is completely isolated, and the device driver associated with each virtual device is unaware of the existence of any other. By isolating each virtual device's data from all other virtual devices, data privacy and integrity can be assured.

Peripheral Component Interconnect Express (PCIe) is a very widely used, standardized, computer system I/O technology. PCIe includes a virtualization model in which a host Function provides hardware traffic isolation and protection, as well as a standardized interface. Via this standard interface, system software can configure and manage anything from a monolithic device supporting a single Function to a high-throughput device supporting hundreds of virtual Functions. PCIe provides a mechanism entitled Function Level Reset (FLR), which provides a standardized means for system software to reset and reinitialize a Function.

To classify packets at layers 2 through 4 (or even deeper), a multi-function I/O device employs multiple tables, such as TCAMs (Ternary Content Addressable Memory) and SRAMs (Static Random Access Memory), which store information for determining how or where to transfer the packets. To support virtualization of the device across multiple Functions, some or all of these classification tables may be logically partitioned into regions or entries dedicated to different Functions; these regions may or may not be contiguous.

Due to hardware constraints, some of these tables may be built out of a single physical memory block. However, as the PCIe specification stipulates, when an application terminates and an FLR is performed to reinitialize a Function and prepare it for use with a different software image, the corresponding classification table resources (e.g., table entries) must be sanitized to prevent the later software image from seeing the previous image's data. The PCIe specification further requires hardware to be in a power-on state and the FLR completed within a bounded period of time.

However, a classification table used by a high-bandwidth I/O device may be quite large because it may support a large number of communication connections. In addition, table entries are not marked in any way to identify the Functions that own them, and entries owned by different Functions may be interleaved. Because classification tables must be searched entry-by-entry to find and clear entries affected by a change in status of a particular Function, it may be difficult to completely process an FLR within the allotted period of time.

One solution to the need to quickly and completely sanitize a Function's classification table data is to block other Functions from using the I/O device while the reinitialized Function's data is cleared. This solution is rarely acceptable because it may cause a significant amount of dropped traffic while the other Functions' communication connections are paused.

Another solution is to have a dedicated hardware component (e.g., a "walker") search classification tables and clear entries as needed. This solution can be expensive because of the need for additional sophisticated hardware. Another suboptimal solution that requires additional hardware involves the use of multiple instances of a classification table, such as one for each Function.

SUMMARY

In some embodiments of the invention, apparatus and methods are provided for managing packet classification tables within a multi-function I/O device in a non-blocking manner.

In these embodiments of the invention, management logic is implemented on the device to indicate whether or not a packet can be transferred as classified. Illustratively, the logic may indicate whether a function for which the packet is destined is valid, or whether a DMA (Direct Memory Access) engine selected to transfer the packet is bound to a valid function.

The logic comprises a function enabler data structure or set of logic that stores the statuses of individual functions. This data structure or logic may be programmed with one value for a function (e.g., "1") when the function is initialized, and a different value (e.g., "0") when the function is invalid (e.g., because of an FLR or Function Level Reset).

In some embodiments of the invention, the management logic also includes a function-to-DMA bind data structure, or set of logic, for mapping each function supported by the I/O device to the DMA engine(s) bound to that function. In response to input to the function-to-DMA bind of a value for a given function (e.g., to indicate whether it is valid or invalid), it will output updated statuses for the DMA engine(s) bound to that function.

The management logic further includes a gate array that is referenced for each classified packet (during or after the classification process). The gate array is the component that indicates whether the packet can be transferred as classified.

In some embodiments, the gate array comprises cells corresponding to each DMA engine, with the value in each cell indicating whether the DMA engine is currently bound to a valid function. The cells are configured as described above, by the function-to-DMA bind, whenever an element of the function enabler data structure or logic is altered to adjust the status of a function.

In some other embodiments, the function enabler data structure may be implemented as the gate array. In these embodiments, the statuses of a packet's destination functions are examined after the packets are classified. Packets destined only for functions that are marked as invalid are dropped.

In embodiments of the invention, the gate array is quickly updated whenever a function becomes invalid. The function's entries in various classification tables will be cleared, but this can be delayed if necessary (e.g., if higher priority work needs to be handled). The gate array will ensure that packets destined for invalid functions are dropped until such time as the table entries are cleared or reprogrammed.

In some embodiments of the invention, entries in a classification table are configured to identify one or more functions that own or that are otherwise permitted to write to the entries. This protects an entry from being modified impermissibly, and allows rapid identification of entries affected by a change in status of a given function.

DESCRIPTION OF THE FIGURES

FIG. 2 is a block diagram of data structures that may be used in classifying communication traffic, in accordance with some embodiments of the invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the scope of the present invention. Thus, the present invention is not intended to be limited to the embodiments shown, but is to be accorded the widest scope consistent with the principles and features disclosed herein.

In some embodiments of the invention, apparatus and methods are provided for managing packet classification tables used by a multi-function I/O device, such as a network interface circuit. In these embodiments, when a particular function is reset or reinitialized (e.g., through a Function Level Reset or FLR), table entries corresponding to that function are invalidated before being reprogrammed, and DMA transfers to the function are prevented. After reprogramming is complete, the entries are again made valid and transfers are enabled.

Figure 1:
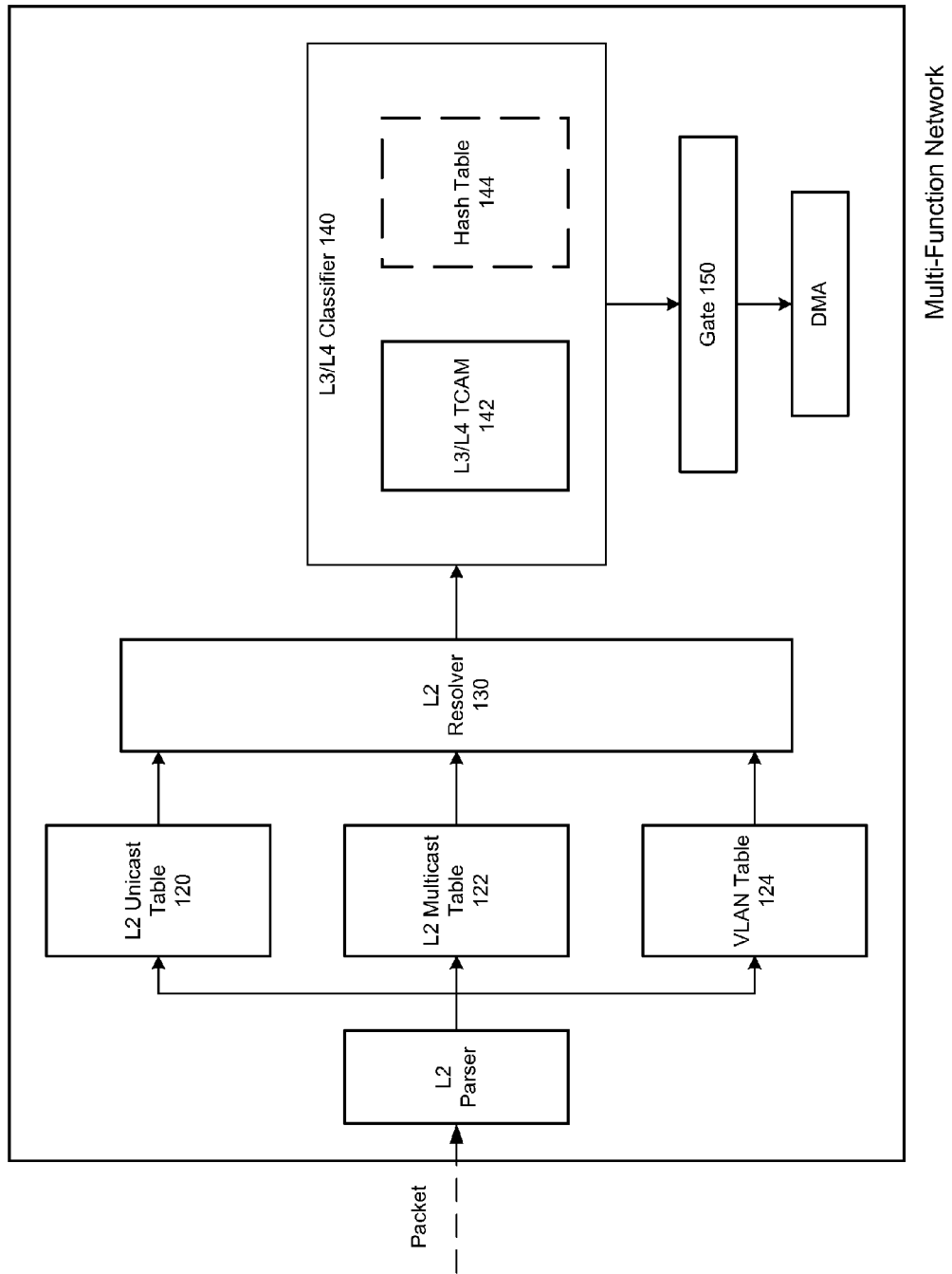
FIG. 1 is a block diagram depicting a network interface device with which some embodiments of the present invention may be implemented.

FIG. 1 is a block diagram depicting a network interface device with which some embodiments of the present invention may be implemented. Illustratively, the network interface device includes one or more high-bandwidth communication ports shared among multiple physical and/or virtual functions, and may be embodied within a single chip.

Network interface device 100 of FIG. 1 depicts tables that are used to classify at least some of the packets received at the device via a communication port shared among multiple functions, and is not intended to illustrate all components of the device. One of ordinary skill in the art will recognize from FIG. 1 and the following description how subject matter of the present invention may be implemented in various I/O devices.

When a packet is received from a network or other communication link, it will be processed by a layer 2 (L2) parser, which directs the packet for processing through any or all of three or more L2 classification tables, such as L2 unicast table 120, L2 multicast table 122 and VLAN (Virtual LAN) table 124. These tables allow the packet to be classified if its layer 2 protocol data indicates it is a unicast, multicast or VLAN packet, respectively.

If either unicast table 120 or multicast table 122 hits on the packet (i.e., has an entry that matches the L2 protocol data), it will output to an L2 resolution component a destination function and a target DMA (Direct Memory Access) engine for transferring the packet to the function. VLAN table 124 outputs a recommendation regarding whether the packet should or should not be dropped, based on whether it is part of a VLAN connection.

L2 resolver 130 resolves input received from the L2 classification tables, forwards the packet's destination function to L3/L4 classifier 140 and recommends one or more DMA engines for transferring the packet to the destination function.

L3/L4 classifier 140 classifies the packet according to its layer 3 and/or layer 4 protocol data. Illustratively, this may involve the use of an L3/L4 TCAM (Ternary Content Addressable Memory) table 142 and possibly hash table 144. These tables may also identify a function to which the packet should be transferred, and suggest a DMA engine to perform the transfer.

Gate logic 150 indicates whether traffic to a particular function or belonging to a particular communication connection is currently enabled or valid. In some embodiments of the invention, each cell of the gate logic corresponds to one DMA engine within device 100, and stores a value indicating whether that DMA engine may or may not be used.

Each DMA engine is allocated or bound to a single function at a time, and one value in its cell (e.g., "1") may indicate that the corresponding DMA engine can be used to transfer a packet to its function, while another value (e.g., "0") may indicate that the DMA engine cannot currently be used, because it is bound to an invalid function or for some other reason (e.g., is not bound to any function).

Illustratively, when the classification process operates to select a DMA engine to transfer a packet, the corresponding cell in gate logic 150 is examined to determine if that DMA engine can indeed be invoked.

One of ordinary skill in the art will appreciate that final classification of a packet may be determined not by L3/L4 classifier 140, but rather by an earlier classification table. For example, if L3/L4 TCAM 142 misses on a packet, the final classification may be that of an L2 table. The diagram of FIG. 1 is intended to encompass all permutations regarding the manner or sequence in which a packet is classified, but is simplified to highlight the use of gate logic 150. Specifically, the gate logic acts on the final classification result, regardless of which classification table or entity produces that result.

In some embodiments of the invention, cells within the gate logic correspond to individual functions (e.g., rather than DMA engines). In these embodiments, a 0 may indicate that traffic to a particular function is currently disabled (i.e., is not to be transferred to the function) and a 1 may indicate that traffic is enabled, or vice versa.

If data transfers via a particular DMA engine or to a destination function are enabled, the packet is passed to the selected DMA engine for transfer. Transferring the packet to a function may involve storing the packet's payload at a specified address within memory of a host coupled to network interface device 100. The "host" may be a computing device, a processor, a switch, a PCIe (Peripheral Component Interconnect Express) root complex or some other entity that executes logic (e.g., a software image) corresponding to or bound to the destination function.

FIG. 2 is a block diagram of data structures that may be used in classifying communication traffic, in accordance with some embodiments of the invention. In particular, FIG. 2 demonstrates how some of the tables for classifying packets received at a multi-function communication interface may be implemented.

Although FIG. 2 illustrates only L2 unicast table 202 and L3/L4 classification table 212, from the descriptions provided herein one of ordinary skill in the art will appreciate how other classification tables (e.g., L2 multicast and VLAN tables, a hash table) may be implemented.

L2 unicast table 202 may be indexed by address (e.g., destination MAC address, source MAC address), such that each entry in table 202 comprises a unique address field corresponding to a destination address currently in use by a software image executing on a host. For each destination address, the function that currently serves that address is identified in a function field, while a DMA field identifies one or more DMA engines that may be used to transfer a packet to the specified function.

Similar to table 202, L3/L4 classification table 212 comprises entries for different communication flows or connections used by a host coupled to the communication interface device comprising tables 202, 212. These entries are indexed by a key field which may illustratively comprise layer 3 and/or layer 4 address data (e.g., IP addresses/ports). For each valid entry, a destination function and one or more DMA engines for transferring a packet to that function are identified in table 212. In some implementations, the key field may comprise the function and/or DMA engine fields.

It may be noted that an L2 unicast table and/or an L3/L4 classification table may include additional data fields omitted from FIG. 2 in the interest of clarity. In addition, tables for classifying packet traffic, such as tables 202 and 212, may be of virtually any size. In a high-performance I/O device, the tables may have hundreds or even thousands of entries. Because any given function may own any number of entries in the table, clearing an invalidated function's entries may require a measurable amount of time.

Gate logic 222 is unlike gate 150 of FIG. 1 in that individual cells correspond to different functions residing on hosts coupled to the I/O device. Thus, instead of determining whether a particular DMA engine can be used to transfer a packet, gate logic 222 is used to determine whether a packet destined for a specific function (e.g., as determined by one or more classification tables) can or should be transferred to that function.

In particular, each entry 224 in logic 222 indicates whether a corresponding function is currently valid or enabled. If valid or enabled (e.g., a binary value has been set to 1), a packet destined for that function may be transferred. If not valid, or disabled (e.g., a binary value is cleared (0)), the packet should be dropped or diverted.

In some embodiments of the invention, a function is disabled (along with a corresponding entry 224 in logic 222) when a function level reset (FLR) is performed on that function's software image. A new function (and corresponding entry in logic 222) is enabled after all classification table entries allocated to that function have been cleared of any previous data (e.g., data from a previous function that used the entries) and the function has been bound to a new software image.

In embodiments of the invention, gate logic 222 is consulted only after a packet has been classified at one or more layers of a protocol stack. Therefore, when a function has been disabled, one or more classification table entries for that function may continue to store seemingly valid data even though the function has been disabled (e.g., via the gate logic), and so packets addressed to that function may continue to be received and classified.

This is acceptable, because any packets that are received and classified after the function is disabled, but before its classification table entries are cleared, will be dropped when the gate logic is consulted. Only after the entries are cleared and/or populated with data for a different function or communication connection will a corresponding entry in the gate logic be set to allow packets to be forwarded.

In some alternative embodiments of the invention, gate logic may be applied or referred to earlier in the packet classification process, instead of only after multiple packet classification tables have been applied.

Programming of gate logic may be performed by a service processor that may be located on the I/O device that comprises the gate logic, or that may be located on a host entity coupled to the interface device. The service processor executes FLRs, and in doing so clears appropriate entries in the gate logic, clears a terminated function's entries in one or more classification tables, sets entries in the gate logic when corresponding functions can receive packet traffic and performs other tasks related to the management of packet classification tables, as recognized by one of ordinary skill in the art.

The service processor may manipulate an entry in a packet classification table based on input from a particular physical or virtual function. For example, when a virtual function is created to share a physical function, and is bound to a software image, it may prompt the service processor to program entries that it has been allocated.

It may be noted that, in some embodiments of the invention, an FLR may be handled by specialized hardware located on the I/O device instead of by a service processor. In these embodiments, a service processor may be omitted from the device.

Figure 3:
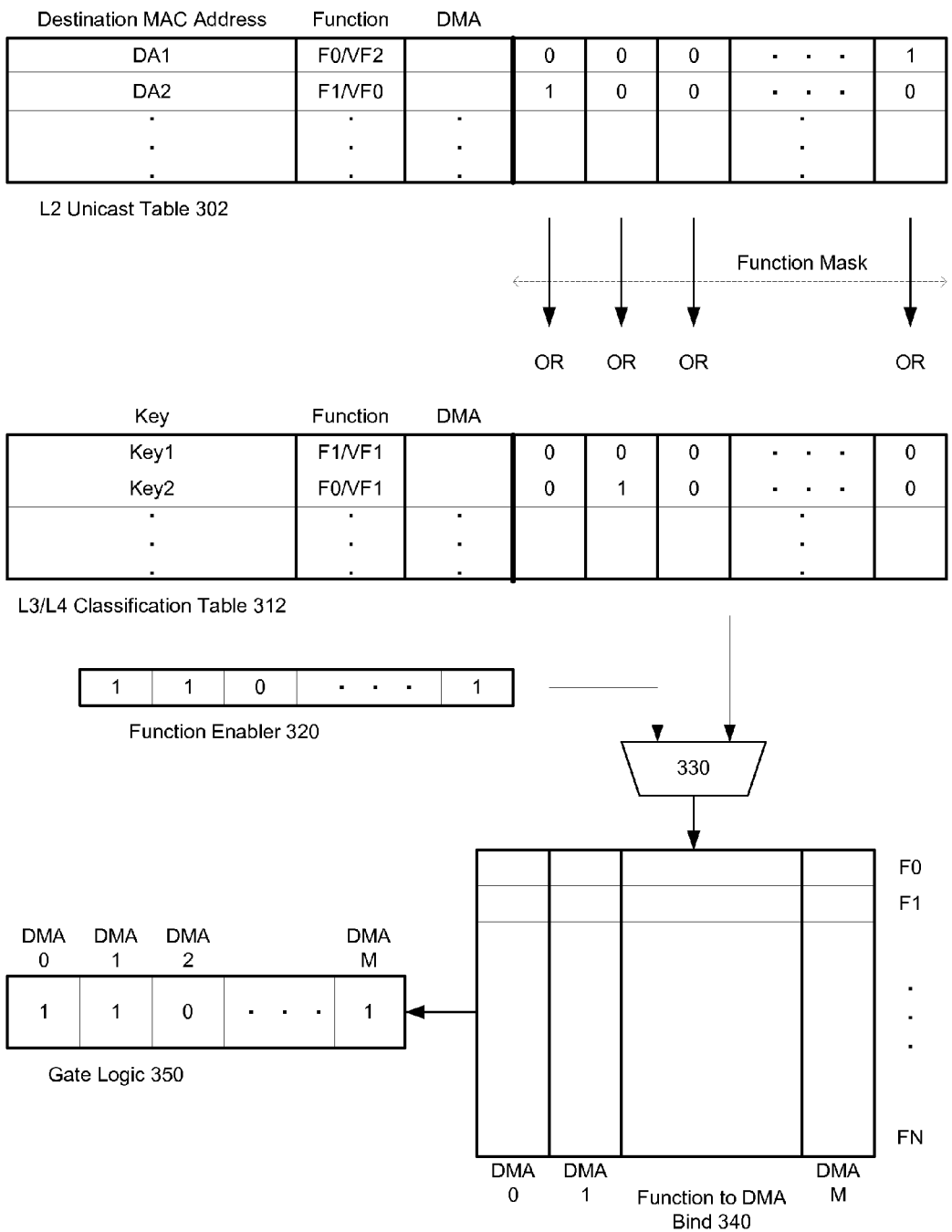
FIG. 3 illustrates alternative data structure formats for packet classification that may be employed in some embodiments of the invention.

However, regardless of whether an FLR is performed by hardware or by a service processor, no function should be permitted to access any entry that that it does not "own." To show ownership of table entries, in some embodiments of the invention a packet classification table may be expanded to include additional information, as shown in FIG. 3 for example.

FIG. 3 illustrates data structure formats for packet classification that may be employed in some embodiments of the invention. In these embodiments, each entry in a packet classification table includes a mask that identifies whether a function that owns the entry (and to which a packet that hits on the entry is to be transferred) is valid. Also, in these embodiments, gate logic for determining whether a classified packet may be transferred to a host comprises cells that correspond to individual DMA engines, and that indicate whether they are currently valid or usable.

As shown in FIG. 3, every entry in L2 unicast table 302 and L3/L4 classification table 312 includes a function mask. Bits in the mask correspond to individual functions, and indicate whether that function "owns" the entry. Thus, the size of the mask may be determined by the maximum number of functions supported by the I/O device.

In some embodiments of the invention, only one function may own a classification table entry, and that owner is the only function able to write to that entry. In some other embodiments, multiple functions may be permitted to own one entry; all or some subset of them may be permitted to write to the entry. A service processor or other supervisory entity may be configured to change ownership of any entry.

Illustratively, function masks associated with entries in a classification table may be stored in the same or different memory module(s). For example, function masks for L3/L4 classification table 312 may be stored in a separate RAM module, but still form part of the TCAM subsystem.

When the service processor or hardware that manages the classification tables is requested to program or reprogram an entry, it can determine which function is requesting the action based on the request itself, or by comparing an address from which the request was received with addresses allotted to different functions, or in some other manner. The processor can therefore ensure that the requesting function owns the target entry and, if so, will program it as requested.

When a given function is reset, the masks for all of that function's classification table entries will be cleared or reprogrammed to allocate the entries to other functions. When a new function is initialized, any number of un-owned entries may be allocated to that function by setting the mask entries accordingly.

FIG. 3 also illustrates other logic that, in combination with the function masks, allows gate logic 350 to be easily programmed and reprogrammed.

In particular, the output of OR'ing all the function masks is combined at combination logic 330 (e.g., an AND gate) with function enabler logic 320, and fed to function-to-DMA bind logic 340. The output of which is used to program gate logic 350.

In these embodiments of the invention, function enabler logic 320 stores the statuses (e.g., valid or invalid) of every function served by the I/O device. As described above in relation to FIG. 2, in some embodiments of the invention, function enabler 320 may be used as gate logic (e.g., gate logic 222) if the output of the packet classification process identifies a target set of functions. Function enabler logic 320 may be programmed by a service processor or comparable entity.

However, in the embodiments of FIG. 3, function enabler 320 is configured similar to the function masks (i.e., one cell for each function), and thus can be AND'd or otherwise compared at logic 330 with the output of the function mask OR'ing. The output of logic 330 identifies only those functions that are currently valid and that have one or more entries in the classification tables.

By combining the function enabler logic with the function mask OR operation, a service processor is able to reclaim or re-assign just a subset of all classification table entries owned by a particular function, rather than all the function's entries. Thus, the software obtains per-entry control and can, for example, easily migrate ownership of entries without shutting down or pausing a function and without blocking the entire classification table.

Function-to-DMA bind logic 340 maps each function to the DMA engines that are bound to the function. Thus, logic 340 receives as input the identities of valid functions, and outputs identities of all DMA engines currently bound to those functions (or, alternatively, may identify all DMA engines that are not currently bound to a valid function).

Gate logic 350 may therefore comprise a combination (e.g., an AND) of the entries in function-to-DMA bind logic 340 for functions input to logic 340. A candidate set of DMA engines identified by a packet classification effort may therefore be filtered (e.g., or AND'd) with the gate logic to identify a set of DMA engines that will be used to transfer a packet.

Figure 4:
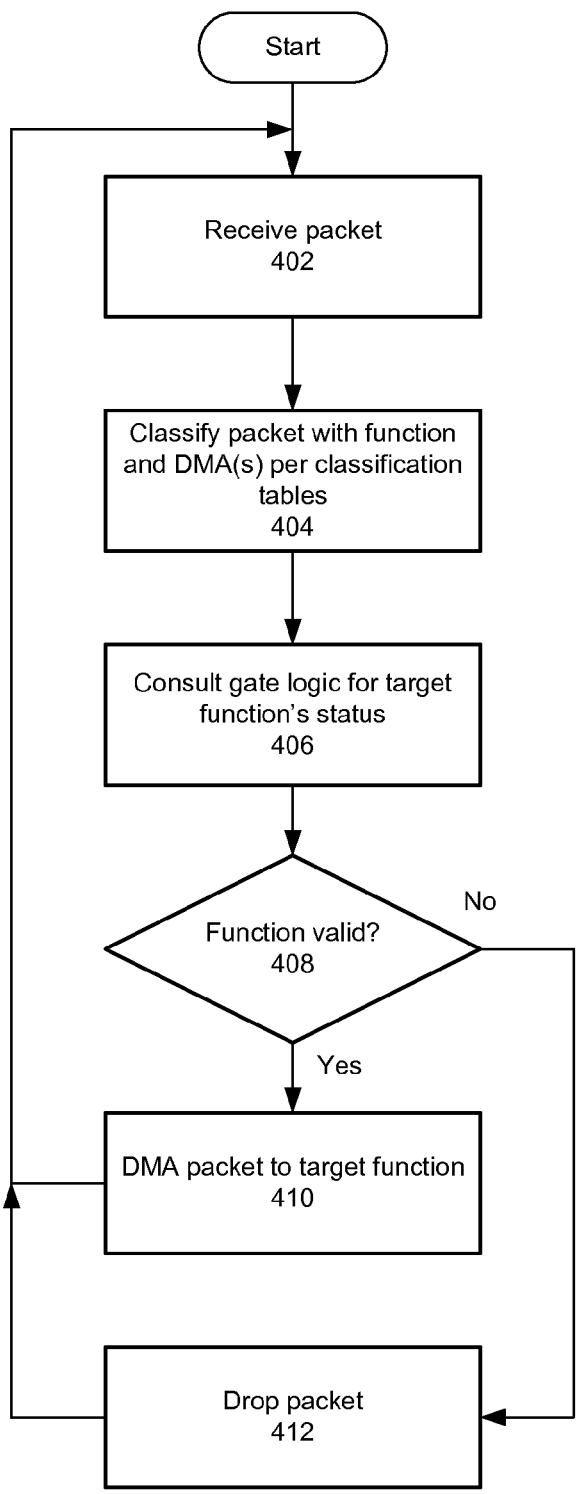
FIGS. 4-5 are flow charts demonstrating management of packet classification tables for a multi-function network interface device, according to some embodiments of the invention.
Figure 5:
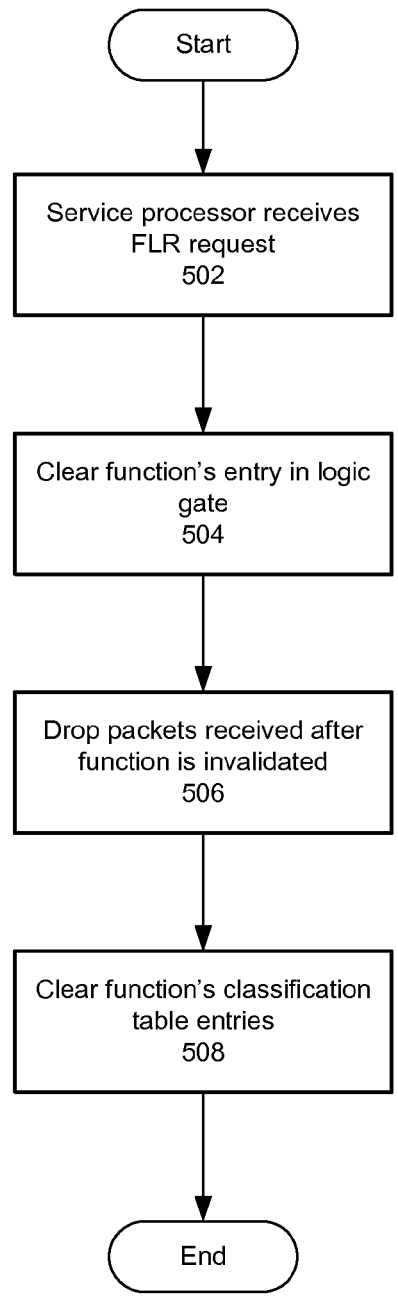

FIGS. 4-5 are a flow charts demonstrating management of packet classification tables for a multi-function network interface device, according to some embodiments of the invention.

FIG. 4 demonstrates the use of gate logic to prevent packets from being forwarded to an invalidated function—a function that has been terminated, reset or that is otherwise unavailable.

In operation 402, a packet is received at the communication interface, and may receive some initial low-level processing, such as through a MAC (Medium Access Control) filter.

In operation 404, the packet is classified at higher layers of an applicable protocol stack, such as layers two and three for TCP/IP (Transmission Control Protocol/Internet Protocol) traffic. This classification may involve multiple classification tables implemented in memory or specialized hardware on the interface, and serves to identify a destination function (physical or virtual) for the packet and/or one or more DMA engines that may be used to transfer the packet to that function.

In operation 406, after the packet is classified, it is determined whether the destination function or selected DMA engine is valid. This indicates whether the packet can be transferred as classified. Illustratively, this operation may involve reading a logic gate, array or other data structure that stores status information for the multiple functions using the interface or the multiple communication connections transiting the interface.

As described above, in some embodiments of the invention, a logic gate comprises entries for each DMA engine of the I/O device. In these embodiments, each entry indicates whether a corresponding DMA engine can be used (e.g., whether it is currently bound to a valid function). In other embodiments, a logic gate may comprise entries for each function that may be supported.

In operation 408, if the destination function is invalid (e.g., terminated, reset) or the selected DMA engine is bound to an invalid function, the method advances to operation 412.

Otherwise, in operation 410, the packet is transferred to the destination function (a memory address allocated to the function) by a selected DMA engine. After operation 410, the method may end or may return to operation 402 when another packet is received.

In operation 412, the packet is dropped. After operation 412, the method may end or may return to operation 402 when another packet is received.

It may be noted that in some alternative embodiments of the invention, determination of the status of a target function or a communication connection for the purpose of determining whether to forward or drop a packet may be made before or during classification, rather than afterward.

FIG. 5 demonstrates the reprogramming of packet classification tables when a function is terminated or reset (e.g., when an FLR is initiated).

In operation 502, a service processor, hypervisor or other supervisory entity receives or initiates a Function Level Reset (FLR) on a particular function.

In operation 504, the function's record or cell in a logic gate, array or other data structure for recording functions' statuses is cleared or otherwise programmed to indicate that the function is now invalid.

For example, a function's status may be reflected in gate logic such as gate logic 222 of FIG. 2, and be used in the packet classification process to determine whether a packet directed to a particular function can be transferred. Or, a function's status may be reflected in a data structure such as function enabler logic 320 of FIG. 3, which is used to program gate logic (e.g., gate logic 350 of FIG. 3) to identify DMA engines currently bound to valid functions.

In operation 506, and as shown in FIG. 4, packets that are received for the function after it is invalidated, but while classification table entries that had been allocated to the function still contain data related to the function, are dropped.

In operation 508, after the function's status has been marked as invalid, classification table entries allocated to the function are cleared or reprogrammed. In some embodiments, operations 506 and 508 may be completed within a period of time indicated in the PCIe specification (e.g., 100 ms). After operation 508, the method ends.

As described previously, when a classification table entry is being reprogrammed ownership of the entry may be verified. An entry may be cleared by a service processor (including indication of ownership as shown in the function masks of FIG. 3) without checking ownership (e.g., in association with an FLR as shown in FIG. 5). However, when the entry is reprogrammed (e.g., with a different key), its ownership may be verified to ensure that the reprogram request is received from the entry's owner or another authorized entity.

Figure 6:
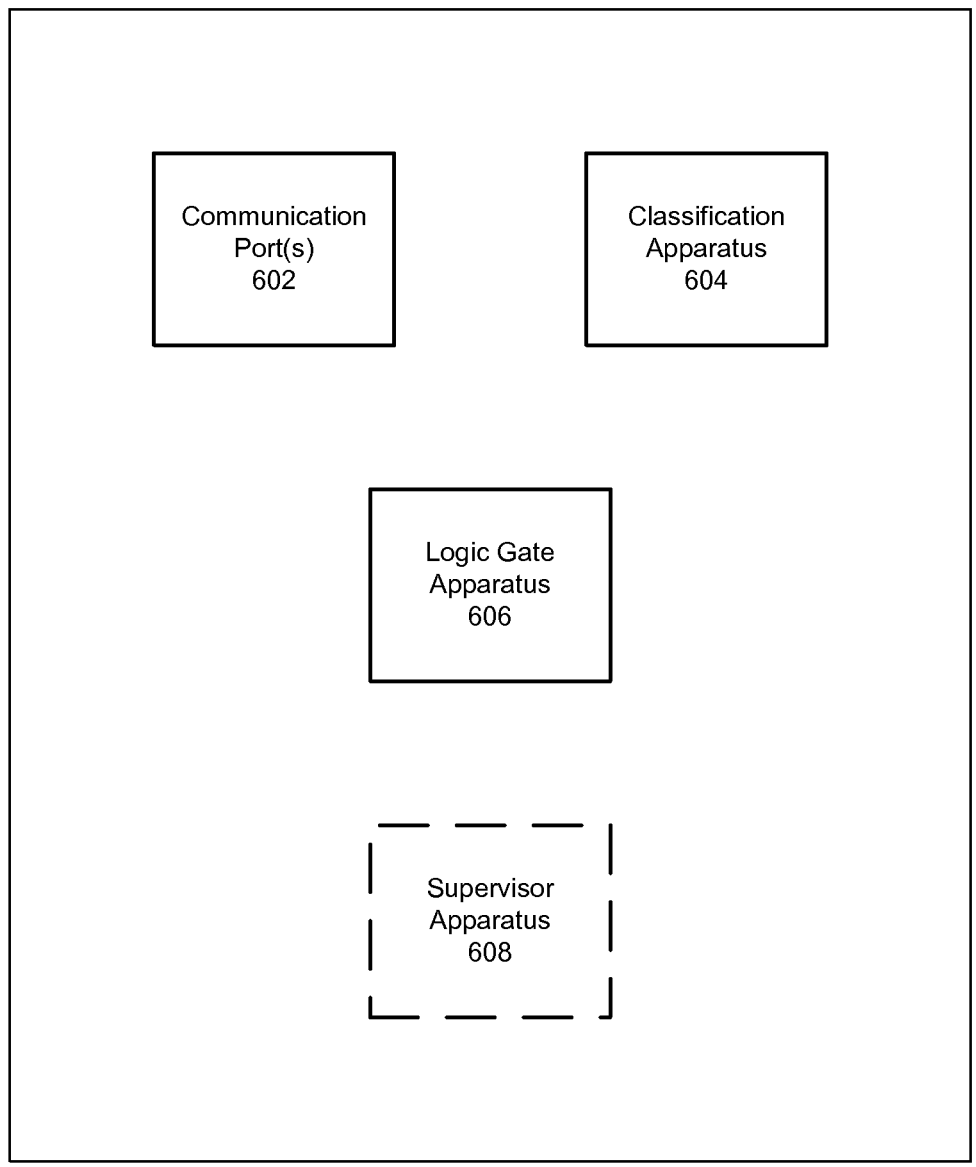
FIG. 6 is a block diagram of apparatus for managing packet classification tables for a multi-function I/O device, according to some embodiments of the invention.

FIG. 6 is a block diagram of apparatus for managing packet classification tables for a multi-function I/O device, according to some embodiments of the invention.

Communication apparatus 600 of FIG. 6 comprises one or more communication ports 602 for receiving packets, frames, datagrams, cells or other communications from networks or other communication links. Apparatus 600 also includes one or more classification apparatus 604, logic gate apparatus 606 and optional supervisor apparatus 608.

Classification apparatus 604 is/are adapted to classify a communication received at apparatus 600 to identify a physical or virtual function to which the communication is directed. To classify the communication, apparatus 604 may examine its contents (e.g., protocol headers, payload) and compare those contents to entries stored in one or more classification tables to identify a flow or connection to which the communication belongs. Apparatus 604 may also identify a function corresponding to the flow, select one or more DMA engines for transferring the communication to one or more functions, and/or perform other tasks.

Logic gate apparatus 606 is adapted to indicate the statuses of one or more physical/virtual functions currently using communication apparatus 600 to engage in one or more communication connections. Illustratively, apparatus 606 may be configured with a first value for a given function to indicate that it is valid (and can receive communications directed to it), or a second value to indicate that it is invalid (and that communications directed to it can be discarded). The logic gate apparatus may also comprise logic programmed to identify DMA engines that are currently bound to valid functions.

Thus, in some embodiments of the invention, logic gate apparatus 606 primarily comprises logic that identifies statuses of one or more physical and/or virtual functions served by communication apparatus 600. This logic may operate as gate logic for determining whether a classified packet may be transferred as classified by packet classification apparatus 604.

In some other embodiments, logic gate apparatus 606 comprises function enabler logic for identifying function statuses, plus function-to-DMA bind logic for mapping each function to one or more DMA engines bound to that function, and a gate logic that is configured to identify statuses of those DMA engines rather than the functions. In these embodiments, the status of a DMA engine identified by the gate logic comprises an indication as to whether the DMA engine is bound to a valid function.

Supervisor apparatus 608 is adapted to help manage classification apparatus 604. Illustratively, apparatus 608 may comprise a service processor. Apparatus 608 is adapted to program or reprogram entries in classification apparatus 604 and/or logic gate apparatus 606 upon request by a software image or function. If supervisor 608 is omitted from communication apparatus 600, a comparable entity may operate on a host entity coupled to the apparatus.

The environment in which a present embodiment of the invention is executed may incorporate a general-purpose computer or a special-purpose device such as a hand-held computer or a computer server. Details of such devices (e.g., processor, memory, data storage, display) may be omitted for the sake of clarity.

Data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), and other media capable of storing computer-readable media now known or later developed.

Methods and processes described in the detailed description can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable logic devices now known or later developed. When the hardware modules or apparatus are activated, they perform the methods and processes included within them.

The foregoing descriptions of embodiments of the invention have been presented for purposes of illustration and description only. They are not intended to be exhaustive or to limit the invention to the forms disclosed. Accordingly, many modifications and variations will be apparent to practitioners skilled in the art. The scope of the invention is defined by the appended claims, not the preceding disclosure.

What is claimed is:

1. An input/output device for simultaneously supporting multiple functions, the device comprising:
   a plurality of classification entities, wherein each of multiple entries in each of the entities is configured to facilitate classification of a packet, wherein each entry in the multiple entries comprises a bit mask that identifies each function in the multiple functions that owns the entry;
   function enabler logic comprising a second bit mask that is configured to indicate a valid or invalid status of each function having a communication connection that traverses the input/output device;
   gate logic operable upon a final classification of the packet to indicate whether the packet may be transferred according to the final classification; and
   wherein the gate logic is configured to indicate whether the packet may be transferred by logically combining bit masks for each entry in the multiple entries corresponding to the packet with the second bit mask.

2. The input/output device of claim 1, further comprising:
   function-to-DMA (Direct Memory Access) bind logic configured to identify, for each function, one or more DMA engines bound to the function.

3. The input/output device of claim 1, wherein:
   when a function-level reset is performed on a first function, a portion of said function enabler logic corresponding to the first function is reprogrammed to indicate that the first function is invalid.

4. The input/output device of claim 1, wherein one or more entries in the plurality of classification entities corresponding to a given function are cleared only after a portion of said gate logic associated with the given function is reprogrammed to indicate the given function is invalid.

5. The input/output device of claim 1, further comprising:
   a plurality of DMA (Direct Memory Access) engines for transferring packets from the input/output device;

wherein said gate logic comprises a cell corresponding to each DMA engine and is configured to indicate whether a function to which the corresponding DMA engine is bound is valid.

6. The input/output device of claim 1, wherein:
said gate logic comprises a cell corresponding to each function having at least one communication connection that traverses the input/output device; and
a given cell in the gate logic is configured to indicate whether the corresponding function is valid.

7. The input/output device of claim 1, wherein:
each entry in a classification entity comprises a mask configured to identify one or more functions with permission to reprogram the entry.

8. The input/output device of claim 1, further comprising:
a communication link coupling the input/output device to a host entity comprising a supervisor configured to manage said gate logic.

9. The input/output device of claim 1, wherein:
the plurality of classification entities is shared among multiple functions.

10. The input/output device of claim 1, wherein the plurality of classification entities comprises:
a layer two table for classifying the packet according to a layer two protocol; and
a layer three table for classifying the packet according to a layer three protocol.

11. The input/output device of claim 1, wherein the destination function is a PCIe (Peripheral Component Interconnect express) function.

12. A method of managing packet classification in an input/output device configured to simultaneously support multiple functions, the method comprising:
receiving a packet;
classifying the packet to identify a destination function of the packet by performing one or more lookups using one or more classification entities, each classification entity comprising multiple entries, wherein each entry in the multiple entries comprises a bit mask that identifies each function in the multiple functions that owns the entry;
after said classifying, determining whether the destination function is valid by logically combining bit masks for each entry in the multiple entries corresponding to the packet with a second bit mask, wherein each entry in the second bit mask indicates a valid or invalid status of each function having a communication connection that traverses the input/output device; and
only if the destination function is valid, writing the packet to memory allocated to the function.

13. The method of claim 12, wherein:
said classifying comprises selecting at least one DMA (Direct Memory Access) engine to transfer the packet; and
said determining comprises determining whether the at least one DMA engine is bound to a valid function.

14. The method of claim 12, further comprising:
receiving a function level reset for a first function; and
programming a logic gate to indicate the first function is invalid.

15. The method of claim 14, further comprising:
only after said programming the logic gate, clearing one or more packet classification table entries associated with the first function.

16. The method of claim 15, further comprising:
only after said clearing one or more packet classification table entries, programming the logic gate to indicate the first function is valid.

17. The method of claim 12, wherein said determining comprises reading a logic gate configured to identify statuses of multiple functions.

18. A non-transitory processor-readable storage medium storing instructions that, when executed by a processor, cause the processor to perform a method of managing packet classification in a multi-function input/output device, the method comprising:
receiving a packet;
classifying the packet to identify a destination function of the packet by performing one or more lookups using one or more classification entities, each classification entity comprising multiple entries, wherein each entry in the multiple entries comprises a bit mask that identifies each function in the multiple functions that owns the entry;
after said classifying, determining whether the destination function is valid by logically combining bit masks for each entry in the multiple entries corresponding to the packet with a second bit mask, wherein each entry in the second bit mask indicates a valid or invalid status of each function having a communication connection that traverses the input/output device; and
only if the destination function is valid, writing the packet to memory allocated to the function.

* * * * *